US012142825B2

(12) United States Patent
Chen et al.

(10) Patent No.: US 12,142,825 B2
(45) Date of Patent: Nov. 12, 2024

(54) RADOME CONFIGURED WITH DUAL-LAYER DOUBLE-RING CIRCUITRY

(71) Applicant: Alpha Networks Inc., Hsinchu (TW)

(72) Inventors: Yao-Jen Chen, Hsinchu (TW); Pao-Wei Lin, Hsinchu (TW); Chia-Hsien Chen, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 182 days.

(21) Appl. No.: 18/107,317

(22) Filed: Feb. 8, 2023

(65) Prior Publication Data

US 2024/0154301 A1 May 9, 2024

(30) Foreign Application Priority Data

Oct. 25, 2022 (TW) ................................. 111140407

(51) Int. Cl.
*H01Q 1/42* (2006.01)
*H01Q 1/40* (2006.01)

(52) U.S. Cl.
CPC ............... *H01Q 1/422* (2013.01); *H01Q 1/40* (2013.01); *H01Q 1/425* (2013.01)

(58) Field of Classification Search
CPC ............ H01Q 1/28; H01Q 1/288; H01Q 1/32; H01Q 1/38; H01Q 1/42; H01Q 1/422;
(Continued)

(56) References Cited

U.S. PATENT DOCUMENTS 5,798,734 A * 8/1998 Ohtsuka ............... H01Q 9/0414 343/846
5,917,458 A * 6/1999 Ho ......................... H01Q 9/285 343/769

(Continued)

FOREIGN PATENT DOCUMENTS

CN 110707410 1/2020
CN 111900538 A * 11/2020

(Continued)

OTHER PUBLICATIONS

European Patent Office , "European search report", issued on Aug. 23, 2023.

(Continued)

*Primary Examiner* — Dameon E Levi
*Assistant Examiner* — Leah Rosenberg
(74) *Attorney, Agent, or Firm* — WPAT, P.C.

(57) ABSTRACT

A radome for protecting a radar device is disposed in the transmission path of signals to/from the radar device. The radome includes a shell; a first circuit board disposed at a side of the shell facing a radar device to be protected, and configured with a first inner circuit ring and a first outer circuit ring facing toward the shell; a second circuit board disposed between the first circuit board and the shell, and configured with a second inner circuit ring and a second outer circuit ring facing toward the shell; a first insulation layer disposed between the first circuit board and the second circuit board; and a second insulation layer disposed between the second circuit board and the shell. The first and second inner circuit rings are enclosed with and insulated from the first and second outer rings, respectively, and each of the circuit rings forms a closed loop.

6 Claims, 5 Drawing Sheets

(58) Field of Classification Search
CPC ........ H01Q 1/425; H01Q 7/00; H01Q 9/0414; H01Q 15/0026
See application file for complete search history.

(56) References Cited

U.S. PATENT DOCUMENTS

| | | | | |
|---|---|---|---|---|
| 11,075,453 | B1 * | 7/2021 | Bulumulla | H01Q 1/422 |
| 2015/0255862 | A1 | 9/2015 | Lore | |
| 2019/0386364 | A1 * | 12/2019 | Liang | H01Q 15/0086 |
| 2023/0037915 | A1 * | 2/2023 | Chen | H01Q 1/2283 |

FOREIGN PATENT DOCUMENTS

| | | |
|---|---|---|
| CN | 112332099 | 2/2021 |
| CN | 113490615 | 10/2021 |
| CN | 113506991 | 10/2021 |
| CN | 114336039 | 4/2022 |
| CN | 217181198 | 8/2022 |

OTHER PUBLICATIONS

Chakravarty S. et. al. "Application of a microgenetic algoritehm (MGA) to the design of broad-band microwave absorbers using multiple frequency selective surface screens buried in dielectrics.", IEEE Transactions on antennas and propagation, IEEE, USA. vol. 50, No. 3, Mar. 1, 2002. pp. 284-296.
Taiwan Intellectual Property Office , "Notice of allowance" on Oct. 25, 2023.

* cited by examiner

RADOME CONFIGURED WITH DUAL-LAYER DOUBLE-RING CIRCUITRY

FIELD OF THE INVENTION

The present invention relates to a radome, and more particularly to a radome configured with a dual-layer double-ring circuitry.

BACKGROUND OF THE INVENTION

A radome is a structure provided for protecting a radar device from external hitting forces. Since the radome is disposed in the transmission path of signals to/from the radar device, it would block the radar SNR (signal to noise ratio) from effectively transmitting and receiving signals. Therefore, it is necessary to develop a radome, which is capable of protecting the radar device without deteriorating the performance of the radar device.

Conventionally, a radome is made of a single material. Since each kind of material has an inherently applicable range of frequency, the applicability of the radome made of a single material would be quite limited. In other words, it would not be able to provide good transmitting and receiving effects for signals in a wide range of frequency, such as 2 GHz span of wireless signals used in a low earth orbit satellite system. Once the transmitting and receiving effects are unsatisfactory, the performance of the entire system would also be deteriorated. Thus, for the low earth orbit satellite system, as well as other systems using radar devices, it is very important to have a radome, which well reserves the transmitting and receiving effects of the radar device.

SUMMARY OF THE INVENTION

Therefore, the present invention provides a radome, whose internal configuration allows wireless signals in a wide range of frequency to be effectively transmitted and received therethrough.

The present invention provides a radome for protecting a radar device, disposed in the transmission path of signals to/from the radar device. The radome comprises a shell; a first circuit board disposed at a side of the shell facing a radar device to be protected, and configured with a first inner circuit ring and a first outer circuit ring facing toward the shell, wherein the first inner circuit ring is enclosed with and insulated from the first outer ring, and each of the first inner circuit ring and the first outer circuit ring forms a closed loop; a second circuit board disposed between the first circuit board and the shell, and configured with a second inner circuit ring and a second outer circuit ring facing toward the shell, wherein the second inner circuit ring is enclosed with and insulated from the second outer ring, and each of the second inner circuit ring and the second outer circuit ring forms a closed loop; a first insulation layer disposed between the first circuit board and the second circuit board; and a second insulation layer disposed between the second circuit board and the shell.

According to the present invention, the applicable bandwidth of the radome can be optimized by adjusting the parameters of the layers and rings of the radome.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

It is understood by those skilled in the art that the intensity of a wireless signal, upon passing through a radome, will decay more or less, varying with the angle of incidence. Therefore, the present invention aims to provide a radome, which allows wireless signals in a wide range of frequency to be effectively transmitted through with minimized loss of intensity, even if the wireless signals are incident at relatively large angles, e.g. 60 degrees. The range of frequency, in which the intensity of a wireless signal incident at a specifically large angle does not change significantly, is defined as an applicable bandwidth of the radome.

Figure 1:
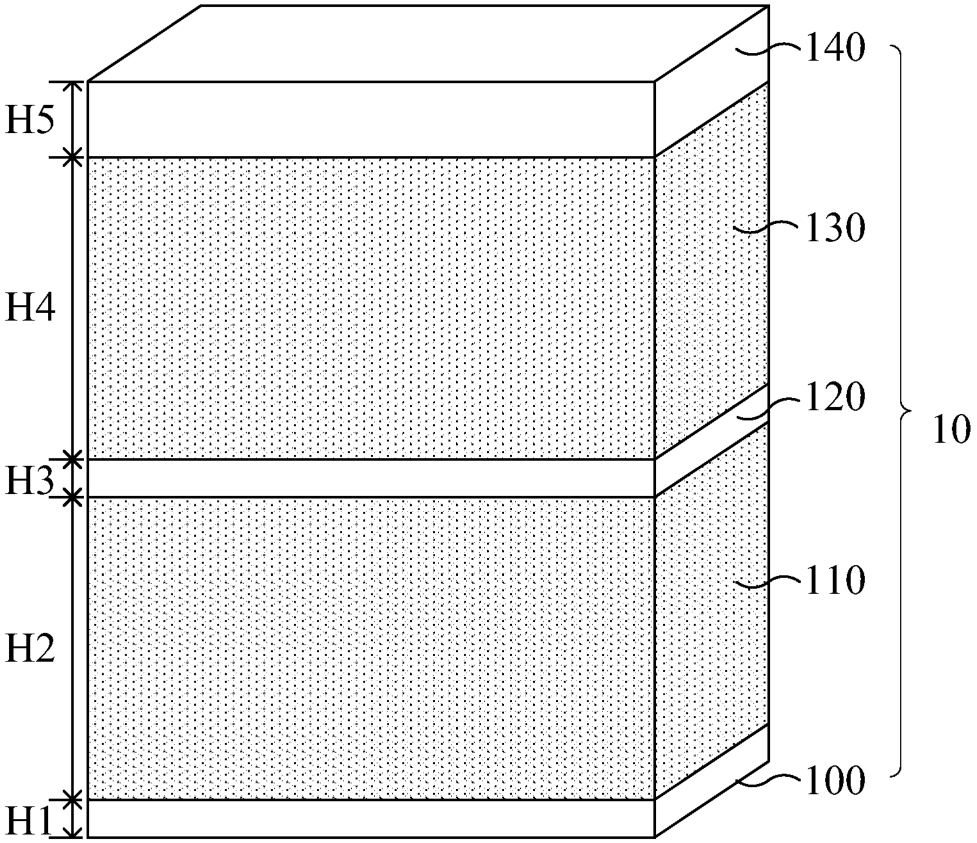
FIG. 1 is a schematic diagram illustrating a configuration of a radome according to an embodiment of the present invention.

A radome according to an embodiment of the present invention includes a shell for protecting a radar device, and configured with a dual-layer double-ring circuitry between the shell and the radar device. For example, as shown in FIG. 1, the radome 10 includes a lower circuit board 100 near the radar device to be protected (not shown), and an upper circuit board 120 near the shell 140, and each of the circuit boards includes an inner circuit ring and an outer circuit ring, which will be described later with reference to FIGS. 2A, 2B, 3A and 3B. The radome 10 further includes a lower insulation layer 110 between the lower circuit board 100 and the upper circuit board 120, and an upper insulation layer 130 between the upper circuit board 120 and the shell 140. The thicknesses of the lower circuit board 100, lower insulation layer 110, upper circuit board 120, upper insulation layer 130 and shell 140 are denoted as H1, H2, H3, H4 and H5, respectively. The term "insulation" used herein indicates a condition of no electric current flow. It is to be noted that although the above-mentioned layers are shown to be completely and directly contiguous with one another, it is only one of the examples for illustration. Alternatively, the adjacent layers may partially contact with each other, or there may be an interleaf layer between two of the layers, depending on practical manufacturing requirements. In other words, it is required that the lower insulation layer 110 be disposed between the lower circuit board 100 and the upper circuit board 120, but it is not necessary for the lower insulation layer 110 to be completely or directly contiguous with the lower circuit board 100 or the upper circuit board 120. Likewise, the requirement is that the upper insulation layer 130 be disposed between the upper circuit board 120 and the shell 140, but it is not necessary for the upper insulation layer 120 to be completely or directly contiguous with the upper circuit board 120 or the shell 140.

Figure 2A:
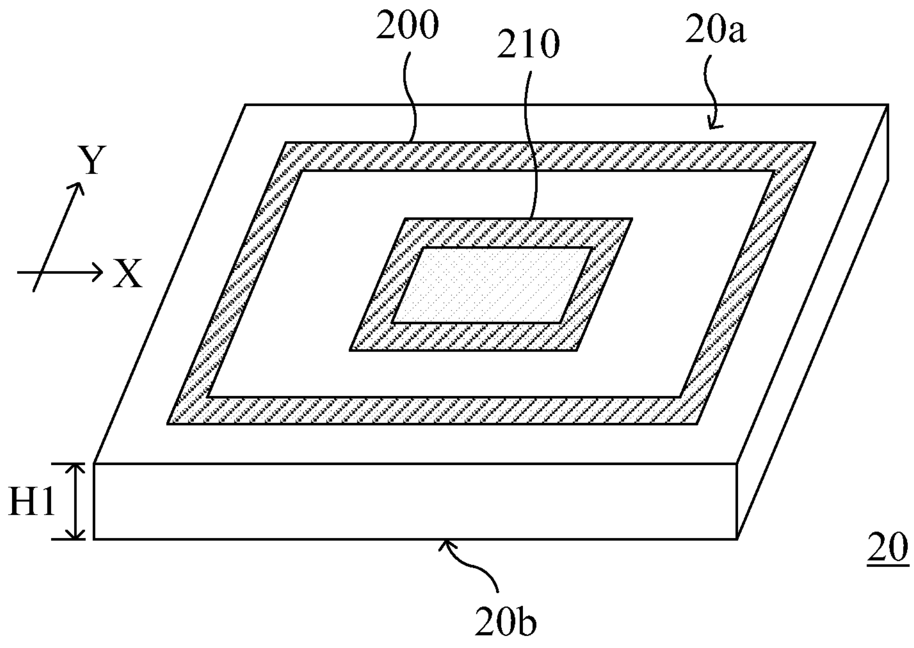
FIG. 2A is a schematic diagram illustrating a circuit board, which can be used in the radome of FIG. 1 as the lower circuit board.

Please further refer to FIG. 2A, in which a double-ring configuration of a circuit board is schematically illustrated. On an active face 20*a* of the circuit board 20, an outer circuit 200 and an inner circuit 210 are formed. The circuit board 20 can be used in the structure shown in FIG. 1 as the lower circuit board 100 with the active face 20*a* facing toward the shell 140. Meanwhile, an opposite face 20*b* of the circuit board 20 faces toward the radar device to be protected by the radome 10 (not shown) when the circuit board 20 is used as the lower circuit board 100 of the radome 10. In this embodiment, each of the outer circuit 200 and the inner circuit 210 is made of metal and forms a closed loop, and the outer circuit 200 and the inner circuit 210 are insulated from each other. Although the outer circuit 200 and the inner circuit 210 are shown to be similar rectangles and have even spacings therebetween, it is understood by those skilled in the art that they do not have to be the same or similar, and are not limited to rectangles. They may also be circles, polygons or any other suitable shapes, depending on practical requirements.

Figure 2B:
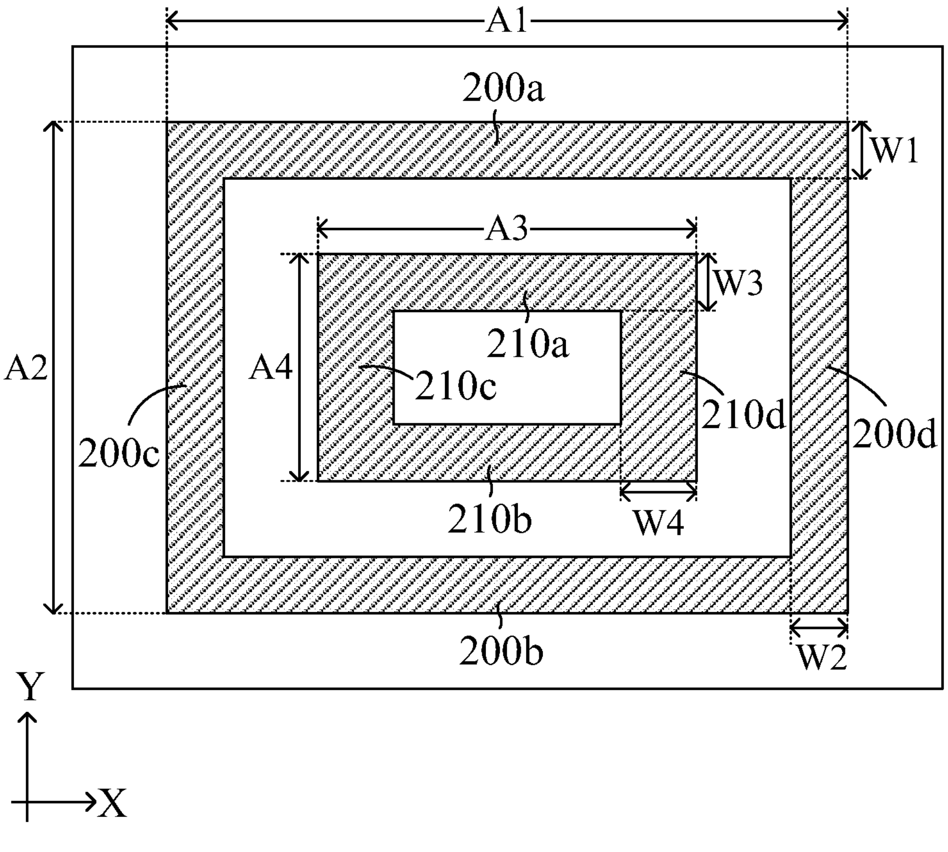
FIG. 2B is a top view of the circuit board show in FIG. 2A.

Subsequently, designs of the double-ring configuration of the circuit board 20 are described in more detail with reference to the top plane view shown in FIG. 2B. X-axis and the Y-axis are commonly used in both FIG. 2A and FIG. 2B to show relevant directions. In this embodiment, the outer circuit 200 is a metal ring defined with sections 200*a* and 200*b* in the X-axis direction and sections 200*c* and 200*d* in the Y-axis direction, which overlap at the four corners of the metal ring. Likewise, the inner circuit 210 is a metal ring defined with sections 210*a* and 210*b* in the X-axis direction and sections 210*c* and 210*d* in the Y-axis direction, which overlap at the four corners of the metal ring. The width and length of each of the sections 200*a* and 200*b* are denoted by W1 and A1; the width and length of each of the sections 200*c* and 200*d* are denoted by W2 and A2; the width and length of each of the sections 210*a* and 210*b* are denoted by W3 and A3; and the width and length of each of the sections 210*c* and 210*d* are denoted by W4 and A4.

With the double-ring configuration according to the present invention, the applicable bandwidth of the radome can be enlarged by adjusting, e.g., increasing, the gap between the outer circuit 200 and the inner circuit 210. In other words, on condition that the wireless signals inputted in a direction normal to the circuit board 20 can be kept at a satisfactory intensity, the larger the gap between the outer circuit 200 and the inner circuit 210, the larger the range of frequency of the wireless signals. It is understood by those skilled in the art that the term "gap" may be defined to be a spacing between specific points or sections of the two metal rings or an equivalent gap calculated according to a designated formula. It may vary with the shapes and relative positions of the rings based on practical designs. However, when a wireless signal within a specified frequency band is inputted at a relatively large angle, e.g., 60 degrees, from the normal direction, the enlarged gap between the outer circuit 200 and the inner circuit 210 would deteriorate the input reflection coefficient S11 of the wireless signal, and thus lower the intensity of the wireless signal entering the radome. As a result, the applicable bandwidth of the redome would not be as wide as expected. Therefore, an optimal gap, instead of a maximal gap, between the outer circuit 200 and the inner circuit 210 is sought in order to obtain optimal applicable bandwidth of the radome. According to the present invention, the optimal gap between the outer circuit 200 and the inner circuit 210 is determined based on the desired bandwidth, and can be achieved by adjusting the width parameters W1, W2, W3, W4, and the length parameters A1, A2, A3, and A4 described above with reference to FIG. 2B.

As mentioned above, the input reflection coefficient S11 of the wireless signal is one of the factors that affect the applicable bandwidth of the radome. The input reflection coefficient S11 is one of scattering parameters commonly used for analyzing conditions of signals in the art. For example, the input reflection coefficient S11 may indicate an input return loss, which is generally obtained by operating the return intensity and the input intensity of the wireless signal, expressed in decibels (dB), and perceived as a negative value. Basically, the greater the absolute value of the negative value, the less the input return loss.

Another positive transmission coefficient S21 is used in the present invention for indicating a transmission insertion loss. The transmission insertion loss is generally obtained by operating an intensity of the wireless signal at a specified position with the presence of the radome and an intensity of the wireless signal at the same position without the presence of the radome, wherein the intensities are expressed in decibels (dB) and perceived as negative values. Basically, the less the absolute value of the negative value, the less the difference between the intensities of the wireless signal obtained with and without the radome, and thus the less the transmission insertion loss.

Figure 3A:
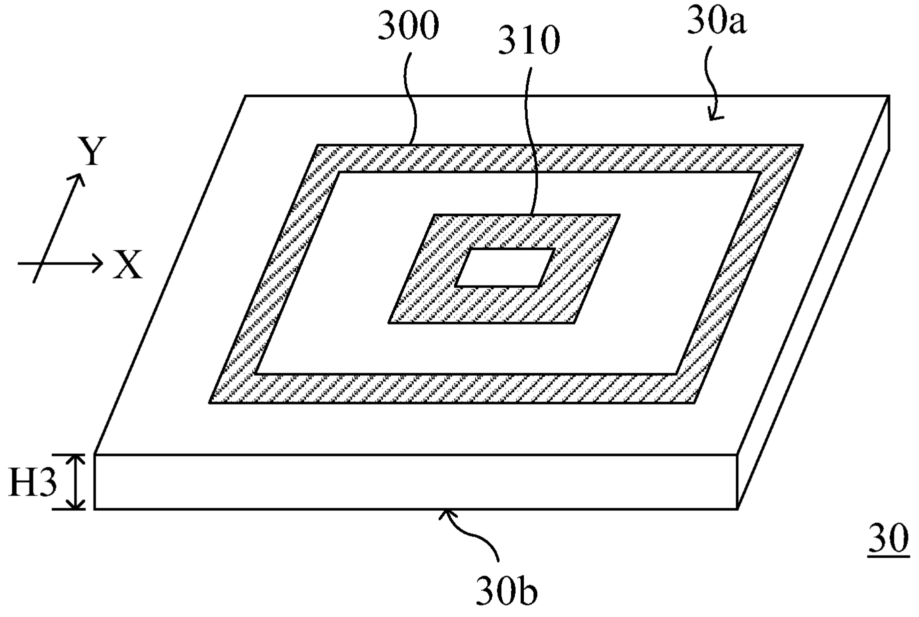
FIG. 3A is schematic diagram illustrating a circuit board, which can be used in the radome of FIG. 1 as the upper circuit board.

Likewise, please further refer to FIG. 3A, in which another double-ring configuration of a circuit board is schematically shown. On an active face 30*a* of the circuit board 30, an outer circuit 300 and an inner circuit 310 are formed. The circuit board 30 is adapted to be used as the upper circuit board 120 shown in FIG. 1, with the active face 30*a* facing toward the shell 140. Meanwhile, an opposite face 30*b* of the circuit board 30 faces toward the radar device to be protected (not shown) by the radome 10 when the circuit board 30 is used as the upper circuit board 120 of the radome 10. Each of the outer circuit 300 and the inner circuit 310 is made of metal and forms a closed loop, and the outer circuit 300 and the inner circuit 310 are insulated from each other. It is understood that the shapes of the outer circuit 300 and the inner circuit 310 do not have to be the same or similar, and are not limited to rectangles. They may also be circles, polygons or any other suitable shapes, depending on practical requirements.

Figure 3B:
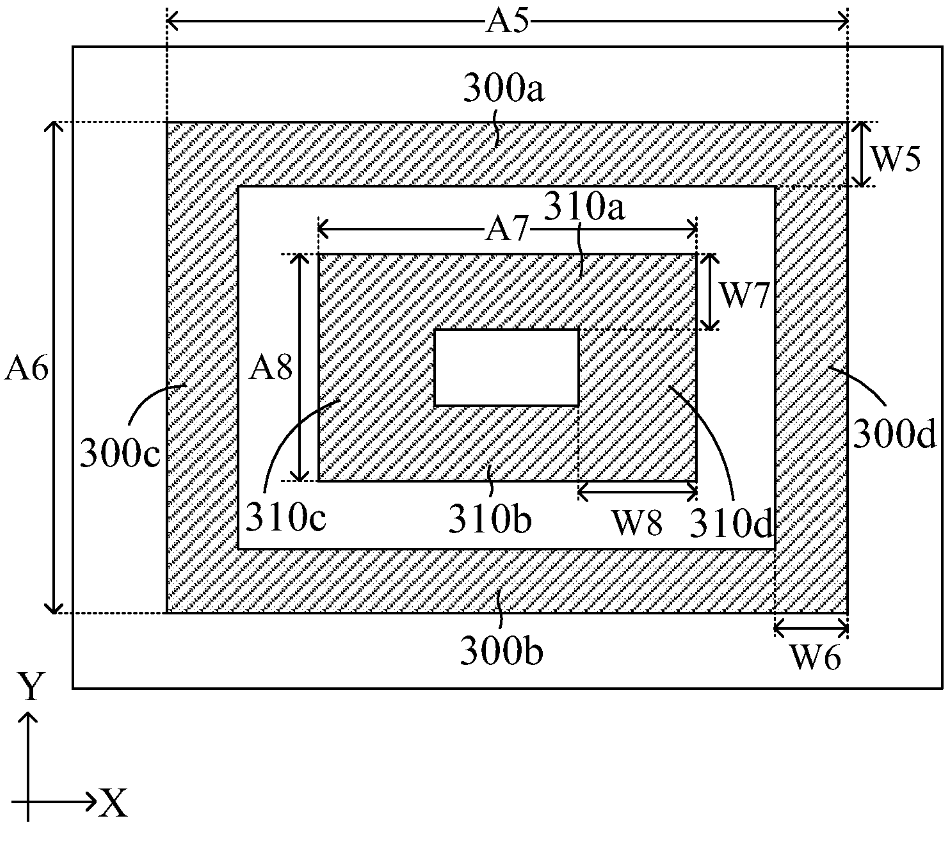
FIG. 3B is a top view of the circuit board show in FIG. 3A.

Subsequently, designs of the double-ring configuration of the circuit board 30 are described in more detail with reference to the top plane view shown in FIG. 3B. X-axis and the Y-axis are commonly used in both FIG. 3A and FIG. 3B to show relevant directions. In this embodiment, the outer circuit 300 in this embodiment is a metal ring defined with sections 300*a* and 300*b* in the X-axis direction and sections 300*c* and 300*d* in the Y-axis direction, which overlap at the four corners of the metal ring. Likewise, the inner circuit 310 is a metal ring defined with sections 310*a* and 310*b* in the X-axis direction and sections 310*c* and 310*d* in the Y-axis direction, which overlap at the four corners of the metal ring. The width and length of each of the sections 300*a* and 300*b* are denoted by W5 and A5; the width and length of each of the sections 300*c* and 300*d* are denoted by W6 and A6; the width and length of each of the sections 310*a* and 310*b* are denoted by W7 and A7; and the width and length of each of the sections 310*c* and 310*d* are denoted by W8 and A8.

As discussed above, while the applicable bandwidth of the radome can be enlarged by increasing the gap between the outer circuit 300 and the inner circuit 310, an optimal gap, instead of a maximal gap, between the outer circuit 300 and the inner circuit 310 is sought in order to obtain optimal applicable bandwidth of the radome. According to the present invention, the optimal gap between the outer circuit 300 and the inner circuit 310 may be determined based on the desired bandwidth, and can be achieved by adjusting the width parameters W5, W6, W7, W8, and the length parameters A5, A6, A7, and A8 described above with reference to FIG. 3B.

In addition to the gap between the outer circuit and the inner circuit of the lower circuit board and/or the upper circuit board, one or more other physical parameters may also be adjusted for achieving an optimal applicable bandwidth of the radome. For example, the applicable bandwidth of the radome may be adjusted by changing the thickness and/or permittivity of the lower insulation layer 110, upper insulation layer 130 and/or shell 140 shown in FIG. 1. Furthermore, the thickness of the lower circuit board 100, the permittivity of the lower circuit board 100, the thickness of the upper circuit board 120, the permittivity of the upper circuit board 120, a distance between the lower circuit board 100 and the upper circuit board 120, and a distance between the upper circuit board 120 and the shell 140 may also be the parameters affecting the applicable bandwidth of the radome 10.

Hereinafter, an example of practical design is given for reference. In this example, for use in a Low Earth Orbit (LEO) satellite, which receives signals at a bandwidth of 10.7-12.7 GHz and transmits signals at a bandwidth of 14.0-14.5 GHz, the radome 10 is designed to have an applicable bandwidth of 10.7-12.7 GHz or 14.0-14.5 GHz for wireless signals input at an angle up to 60 degrees. Furthermore, for simplification, the active face of the lower circuit board 100, e.g., the active face 20*a* shown in FIG. 2A, completely overlaps the lower face of the lower insulation layer 110; the upper face of the lower insulation layer 110 completely overlaps the lower face of the upper circuit board 120, e.g., the face 30*b* shown in FIG. 3A; the active face of the upper circuit board 120, e.g., the active face 30*a* shown in FIG. 3A, completely overlaps the lower face of the upper insulation layer 130; and the upper face of the upper insulation layer 130 completely overlaps the shell 140.

In order to make satisfactory input reflection coefficient S11 and better transmission coefficient S21 of the radome in the designated bandwidth of 10.7-12.7 GHz or 14.0-14.5 GHz, it is desirable that the material of the lower insulation layer 110 and the material of the upper insulation layer 130 have a permittivity lower than both the permittivity of the material of the shell 140 and the material of the circuit boards 100 and 120. For example, the material of the circuit boards 100 and 120 has a relative permittivity of $2.4*8.85\times10^{-12}$ farads per meter (F/m); the material of the shell 140, e.g., polytetrafluoroethylene (PTFE), has a relative permittivity of $2.1*8.85\times10^{-12}$ farads per meter (F/m); and the material of the insulation layers 110 and 130, e.g., foaming material, has a relative permittivity of $1.06*8.85\times10^{-12}$ farads per meter (F/m).

Once the materials for producing the lower circuit board 100 and the upper circuit board 120 are decided, the sizes of metal rings to be formed on the lower circuit board 100 and the upper circuit board 120 can be estimated, for example, based on the following formulae (1) and (2), in which:

$$\varepsilon_{eff} = \sqrt{\frac{\varepsilon_r + 1}{2}} \tag{1}$$

-continued $$L = W = \frac{3*10^8}{2*f_r\sqrt{\varepsilon_{eff}}} \tag{2}$$

where $\in_r$ is a relative permittivity of the substrate material; $\in_{eff}$ is an effective permittivity of the lower/upper circuit board; L and W are lengths of adjacent edges of the metal ring; and $f_r$ is a frequency of a wireless signal applied to the lower/upper circuit board.

For example, the material for producing the lower circuit board 100 and the upper circuit board 120 has a permittivity $\in_r$ of 2.4. The lengths L and W of adjacent edges of the metal ring are the lengths A1 and A2 shown in FIG. 2B or the lengths A5 and A6 shown in FIG. 3B. By respectively substituting the endpoints of the frequency range, which is to be applied to the metal ring, for the frequency $f_r$, an applicable range of lengths L and W can be obtained. Then the optimal lengths L and W in the applicable range of lengths can be determined in further view of additional parameters, which may vary with practical designs.

For example, the parameters shown in Table 1 below are used to produce a radome. The applicable bandwidth of the resulting radome can cover the range of 10.7-12.7 GHz, which is adapted to be used with a radar device of a satellite for receiving signals.

TABLE 1

| Parameter | Value | Parameter | Value |
|---|---|---|---|
| H1 | 0.13 mm | H2 | 6 mm |
| H3 | 0.13 mm | H4 | 8 mm |
| H5 | 1 mm | A1 | 10.44 mm |
| A2 | 10.27 mm | A3 | 6.14 mm |
| A4 | 5.59 mm | A5 | 10.64 mm |
| A6 | 10.04 mm | A7 | 6.61 mm |
| A8 | 5.69 mm | W1 | 0.73 mm |
| W2 | 0.62 mm | W3 | 0.96 mm |
| W4 | 1.76 mm | W5 | 0.74 mm |
| W6 | 0.61 mm | W7 | 1.66 mm |
| W8 | 2.13 mm | | |

Furthermore, in order to unify physical properties of the radome 10 illustrated with reference to FIG. 1, it is desirable that the lower circuit board 100 and the upper circuit board 120 are implemented with the circuit boards 20 and 30 illustrated with reference to FIGS. 2 and 3, and the center points of the outer circuit 200 and inner circuit 210 of the circuit board 20 and the outer circuit 300 and inner circuit 310 of the circuit board 30 are located on the same line, which is normal to the circuit boards 20 and 30. With this configuration, the circuits 200, 210, 300 and 310 overlap with one another to a significant extent.

It is found that the absolute value of the insertion loss, which is indicated with the positive transmission coefficient S21, of the radome made with the above parameters can be less than 1 decibel in programming simulations of both the transverse electric field mode and the transverse magnetic field mode on condition that the wireless signal has a frequency ranged between 10.7 GHz and 12.7 GHz and an angle of incidence between 0 and 60 degrees. Moreover, the absolute value of the input return loss, which is indicated with the input reflection coefficient S11, can be maintained at a level greater than 10. It shows that the radome performs very well in terms of input return loss and insertion loss in the frequency band between 10.7 GHz and 12.7 GHz. The radar device protected with the radome of the present invention can thus be used in conjunction with satellites using a frequency band of 10.7-12.7 GHz for receiving signals.

In another example, the parameters shown in Table 2 below are used to produce a radome. The applicable bandwidth of the resulting radome can cover the range of 14.0-14.5 GHz, which is adapted to be used with a radar device of a satellite for transmitting signals.

TABLE 2

| Parameter | Value | Parameter | Value |
|---|---|---|---|
| H1 | 0.13 mm | H2 | 6 mm |
| H3 | 0.13 mm | H4 | 8 mm |
| H5 | 1 mm | A1 | 8.23 mm |
| A2 | 8.09 mm | A3 | 4.84 mm |
| A4 | 4.41 mm | A5 | 8.38 mm |
| A6 | 7.91 mm | A7 | 5.21 mm |
| A8 | 4.48 mm | W1 | 0.58 mm |
| W2 | 0.49 mm | W3 | 0.76 mm |
| W4 | 1.39 mm | W5 | 0.58 mm |
| W6 | 0.48 mm | W7 | 約 1.31 mm |
| W8 | 1.67 mm | | |

Likewise, the absolute value of the insertion loss, which is indicated with the positive transmission coefficient S21, of the radome made with the above parameters in Table 2 can be less than 1 decibel in programming simulations of both the transverse electric field mode and the transverse magnetic field mode on condition that the wireless signal has a frequency ranged between 14.0 GHz and 14.5 GHz and an angle of incidence between 0 and 60 degrees. The radar device protected with the radome of the present invention is adapted to be used with satellites using a frequency band of 14.0-14.5 GHz for transmitting signals.

Furthermore, in view of the fact that the bandwidth of the radome can be enhanced with a narrow-outside and wide-inside circuit configuration, the width of the outer circuit 200 is designed to have a width narrower than the width of the inner circuit 210, i.e., the width W1 is smaller than the width W3 and the width W2 is smaller than the width W4. Likewise, the width of the outer circuit 300 is designed to have a width narrower than the width of the inner circuit 310, i.e., the width W5 is smaller than the width W7 and the width W6 is smaller than the width W8. It is also noted that a distance between the lower circuit board 100 and the upper circuit board 120, e.g., the thickness H2 of the lower insulation layer 110, is less than a distance between the upper circuit board 120 and the shell 140, e.g., the thickness H4 of the upper insulation layer 110.

To sum up, a radome according to the present invention includes a dual-layer double-ring circuitry, wherein the two rings of each of the two layers of circuits are independent and electrically insulated with each other. For applications with different frequency requirements, the applicable bandwidth of the radome can be modified and the level of intensity loss of the wireless signal, which is incident at a relatively large angle, can be minimized by adjusting the gap between the two layers of circuits or the gap between the two rings of circuits. Moreover, with the dual-layer double-ring circuitry, not only can the applicable bandwidth of radome be improved, compared with the conventional double-layer single-ring circuitry, but the applicable bandwidth of the radome does not change significantly with different angles of incidence of the wireless signal. Therefore, the radome provided according to the present invention can achieve the effect of low insertion loss of the input wireless signal.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A radome for protecting a radar device, disposed in the transmission path of signals to/from the radar device, and comprising: a shell; a first circuit board disposed at a side of the shell facing the radar device to be protected, and configured with a first inner circuit ring and a first outer circuit ring facing toward the shell, wherein the first inner circuit ring is enclosed with and insulated from the first outer circuit ring, and each of the first inner circuit ring and the first outer circuit ring forms a closed loop; a second circuit board disposed between the first circuit board and the shell, and configured with a second inner circuit ring and a second outer circuit ring facing toward the shell, wherein the second inner circuit ring is enclosed with and insulated from the second outer circuit ring, and each of the second inner circuit ring and the second outer circuit ring forms a closed loop; a first insulation layer disposed between the first circuit board and the second circuit board; and a second insulation layer disposed between the second circuit board and the shell.

2. The radome according to claim 1, wherein a distance between the first circuit board and the second circuit board is less than a distance between the second circuit board and the shell.

3. The radome according to claim 1, wherein a permittivity of the first insulation layer and a permittivity of the second insulation layer is less than a permittivity of the shell.

4. The radome according to claim 3, wherein the shell is made of polytetrafluoroethylene (PTFE), and the first and second insulation layers are made of a foaming material.

5. The radome according to claim 1, wherein a width of the first outer circuit ring is less than a width of the first inner circuit ring.

6. The radome according to claim 1, wherein a width of the second outer circuit ring is less than a width of the second inner circuit ring.

* * * * *